United States Patent
Lyons et al.

(10) Patent No.: US 9,074,074 B2
(45) Date of Patent: Jul. 7, 2015

(54) POLYHYDROXY CURABLE FLUOROELASTOMER COMPOSITIONS

(71) Applicant: E I DU PONT DE NEMOURS AND COMPANY, Wilmington, DE (US)

(72) Inventors: Donald F Lyons, Wilmington, DE (US); Peter A Morken, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 120 days.

(21) Appl. No.: 13/676,399

(22) Filed: Nov. 14, 2012

(65) Prior Publication Data

US 2013/0158200 A1 Jun. 20, 2013

Related U.S. Application Data

(60) Provisional application No. 61/570,873, filed on Dec. 15, 2011.

(51) Int. Cl.
| | |
|---|---|
| C08K 5/13 | (2006.01) |
| C08K 5/5425 | (2006.01) |
| C08K 5/54 | (2006.01) |
| C08K 5/56 | (2006.01) |
| C08L 27/16 | (2006.01) |
| C08L 43/04 | (2006.01) |
| C08L 83/06 | (2006.01) |
| C08K 5/57 | (2006.01) |

(52) U.S. Cl.
CPC ............. *C08K 5/5425* (2013.01); *C08K 5/13* (2013.01); *C08K 5/5403* (2013.01); *C08K 5/56* (2013.01); *C08K 5/57* (2013.01); *C08L 27/16* (2013.01); *C08L 43/04* (2013.01); *C08L 83/06* (2013.01)

(58) Field of Classification Search
None
See application file for complete search history.

(56) References Cited

U.S. PATENT DOCUMENTS

| | | |
|---|---|---|
| 3,876,654 A | 4/1975 | Pattison et al. |
| 4,250,278 A | 2/1981 | Furukawa et al. |
| 4,259,463 A | 3/1981 | Moggi et al. |
| 4,394,489 A * | 7/1983 | Aufdermarsh ............... 525/370 |
| 4,748,208 A * | 5/1988 | Kasahara et al. ............ 525/151 |
| 4,882,390 A | 11/1989 | Kolb et al. |
| 4,912,171 A | 3/1990 | Grootaert et al. |
| 4,957,975 A | 9/1990 | Carlson et al. |
| 5,554,680 A | 9/1996 | Ojakaar |
| 5,591,804 A | 1/1997 | Coggio et al. |
| 5,648,429 A | 7/1997 | Chiodini et al. |
| 6,329,469 B1 | 12/2001 | Bowers |
| 6,916,871 B2 | 7/2005 | Hare et al. |

OTHER PUBLICATIONS

Sands, Rubber Chemistry and Technology; Nov./Dec. 2006; 79, 5, p. 765-782.*

* cited by examiner

*Primary Examiner* — Robert C Boyle

(57) ABSTRACT

Disclosed herein is a curable composition comprising a polyhydroxy curable fluoroelastomer, a polyhydroxy curative, a cure accelerator and an unsaturated metal compound process aid. Such curable compositions have a lower Mooney viscosity than do similar compositions absent the process aid.

15 Claims, No Drawings

POLYHYDROXY CURABLE FLUOROELASTOMER COMPOSITIONS

CROSS-REFERENCE TO RELATED APPLICATIONS

This application claims the benefit of U.S. Provisional Application No. 61/570,873 filed Dec. 15, 2011.

FIELD OF THE INVENTION

This invention relates to polyhydroxy curable fluoroelastomer compositions comprising i) a fluoroelastomer, ii) a polyhydroxy curative, iii) a cure accelerator and iv) an unsaturated metal compound process aid.

BACKGROUND OF THE INVENTION

Fluoroelastomers having excellent heat resistance, oil resistance, and chemical resistance have been used widely for sealing materials, containers and hoses. Examples of fluoroelastomers include copolymers comprising units of vinylidene fluoride ($VF_2$) and units of at least one other copolymerizable fluorine-containing monomer such as hexafluoropropylene (HFP), tetrafluoroethylene (TFE), chlorotrifluoroethylene (CTFE), vinyl fluoride (VF), and a fluorovinyl ether such as a perfluoro(alkyl vinyl ether) (PAVE). Specific examples of PAVE include perfluoro(methyl vinyl ether), perfluoro(ethyl vinyl ether) and perfluoro(propyl vinyl ether).

In order to fully develop physical properties such as tensile strength, elongation, and compression set, elastomers must be cured, i.e. vulcanized or crosslinked. In the case of fluoroelastomers, this is generally accomplished by mixing uncured polymer (i.e. fluoroelastomer gum) with a polyfunctional curing agent and heating the resultant mixture, thereby promoting chemical reaction of the curing agent with active sites along the polymer backbone or side chains. Interchain linkages produced as a result of these chemical reactions cause formation of a crosslinked polymer composition having a three-dimensional network structure. Commonly employed curing agents for fluoroelastomers include difunctional nucleophilic reactants, such as polyhydroxy compounds.

Prior to curing, fluoroelastomers are typically compounded with other ingredients (e.g. fillers, colorants, etc.) and shaped (e.g. molded or extruded) into various articles such as seals, o-rings, gaskets and hose. Fluoroelastomer compositions may have a Mooney viscosity that is too high to mix or shape easily. Thus, it would be desirable to have means to lower the Mooney viscosity of fluoroelastomer compositions.

SUMMARY OF THE INVENTION

In one aspect, the present invention provides a curable fluoroelastomer composition comprising:
  A) a polyhydroxy curable fluoroelastomer;
  B) a polyhydroxy curative;
  C) a cure accelerator; and
  D) an unsaturated metal compound process aid having the formula $Y_{(4-n)}MX_n$ wherein Y is selected from alkyl, aryl, carboxylic acid, or alkyl ester groups; M is selected from Si, Ge, or Sn; X is an allyl group $CR^1R^2CR^3{=}CR^4R^5$, vinyl group $CR^1{=}CR^2R^3$, allenyl group $CR^1{=}C{=}CR^2R^3$, alkynyl group $C{\equiv}CR^1$, or propargyl group $CR^1R^2C{\equiv}CR^3$; $R^1$-$R^5$ are selected independently from the group consisting of H, F, alkyl, aryl, heterocycle, or perfluoroalkyl groups; and n is 1, 2, or 3.

DETAILED DESCRIPTION OF THE INVENTION

The present invention is directed to polyhydroxy curable fluoroelastomer compositions that contain an unsaturated metal compound process aid. Such fluoroelastomer compositions have a lower Mooney viscosity than do similar compositions absent the process aid.

Fluoroelastomers that are suitable for use in this invention are those that are polyhydroxy curable. By "polyhydroxy curable" is meant fluoroelastomers which are known to crosslink with polyhydroxy curatives such as bisphenol AF. Such fluoroelastomers include those having a plurality of carbon-carbon double bonds along the main elastomer polymer chain and also fluoroelastomers which contain sites that may be readily dehydrofluorinated. The latter fluoroelastomers include, but are not limited to those which contain adjacent copolymerized units of vinylidene fluoride ($VF_2$) and hexafluoropropylene (HFP) as well as fluoroelastomers which contain adjacent copolymerized units of $VF_2$ (or tetrafluoroethylene) and a fluorinated comonomer having an acidic hydrogen atom such as 2-hydropentafluoropropylene; 1-hydropentafluoropropylene; trifluoroethylene; 2,3,3,3-tetrafluoropropene; or 3,3,3-trifluoropropene. Preferred fluoroelastomers include the copolymers of i) vinylidene fluoride with hexafluoropropylene and, optionally, tetrafluoroethylene (TFE); ii) vinylidene fluoride with a perfluoro(alkyl vinyl ether) such as perfluoro(methyl vinyl ether), 2-hydropentafluoropropylene and optionally, tetrafluoroethylene; iii) tetrafluoroethylene with propylene and 3,3,3-trifluoropropene; iv) tetrafluoroethylene, perfluoro(methyl vinyl ether) and hexafluoro-2-(pentafluorophenoxy)-1-(trifluorovinyloxy) propane, and v) ethylene with tetrafluoroethylene, perfluoro (methyl vinyl ether) and 3,3,3-trifluoropropylene.

In addition to the fluoroelastomer, curable compositions of this invention contain a polyhydroxy cure system, meaning a polyhydroxy curative and a vulcanization (or curing) accelerator.

The curable compositions contain 0.4 to 4 parts by weight (preferably 1 to 2.5 parts) of polyhydroxy curing agent (or a derivative thereof) per 100 parts by weight fluoroelastomer, i.e. 0.4-4 phr (preferably 1-2.5 phr). Typical polyhydroxy cross-linking agents include di-, tri-, and tetrahydroxybenzenes, naphthalenes, and anthracenes, and bisphenols of the formula

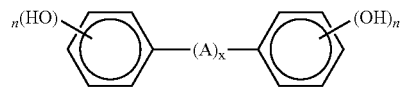

where A is a difunctional aliphatic, cycloaliphatic, or aromatic radical of 1-13 carbon atoms, or a thio, oxy, carbonyl, sulfinyl, or sulfonyl radical; A may optionally be substituted with at least one chlorine or fluorine atom; x is 0 or 1; n is 1 or 2; and any aromatic ring of the polyhydroxylic compound may optionally be substituted with at least one chlorine or fluorine atom, an amino group, a —CHO group, or a carboxyl or acyl radical. Preferred polyhydroxy compounds include hexafluoroisopropylidene-bis(4-hydroxy-benzene) (i.e. bisphenol AF or BPAF); 4,4"-isopropylidene diphenol (i.e. bisphenol A); 4,4"-dihydroxydiphenyl sulfone; and diaminobisphenol AF. Referring to the bisphenol formula shown above, when A is alkylene, it can be for example methylene, ethylene, chloroethylene, fluoroethylene, difluoroethylene, propylidene, isopropylidene, tributylidene, heptachlorobutylidene, hepta-fluorobutylidene, pentylidene, hexylidene, and 1,1-cyclohexylidene. When A is a cycloalkylene radical, it can be for example 1,4-cyclohexylene, 2-chloro-1,4-cyclohexylene, cyclopentylene, or 2-fluoro-1,4-cyclohexylene. Further, A can be an arylene radical such as m-phenylene, p-phenylene, o-phenylene, methylphenylene, dimethylphenylene, 1,4-naphthylene, 3-fluoro-1,4-naphthylene, and 2,6-naphthylene. Polyhydroxyphenols of the formula

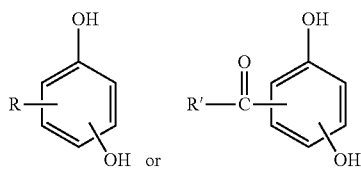

where R is H or an alkyl group having 1-4 carbon atoms or an aryl group containing 6-10 carbon atoms and R' is an alkyl group containing 1-4 carbon atoms also act as effective crosslinking agents. Examples of such compounds include hydroquinone, catechol, resorcinol, 2-methylresorcinol, 5-methyl-resorcinol, 2-methylhydroquinone, 2,5-dimethylhydroquinone, 2-t-butyl-hydroquinone; and such compounds as 1,5-dihydroxynaphthalene and 2,6-dihydroxynaphthalene.

Additional polyhydroxy curing agents include alkali metal salts of bisphenol anions, quaternary ammonium salts of bisphenol anions, tertiary sulfonium salts of bisphenol anions and quaternary phosphonium salts of bisphenol anions. For example, the salts of bisphenol A and bisphenol AF. Specific examples include the disodium salt of bisphenol AF, the dipotassium salt of bisphenol AF, the monosodium monopotassium salt of bisphenol AF and the benzyltriphenylphosphonium salt of bisphenol AF.

Quaternary ammonium and phosphonium salts of bisphenol anions are discussed in U.S. Pat. Nos. 4,957,975 and 5,648,429. Bisphenol AF salts (1:1 molar ratio) with quaternary ammonium ions of the formula $R_1R_2R_3R_4N^+$, wherein $R_1$-$R_4$ are $C_1$-$C_8$ alkyl groups and at least three of $R_1$-$R_4$ are $C_3$ or $C_4$ alkyl groups are preferred. Specific examples of these preferred compositions include the 1:1 molar ratio salts of tetrapropyl ammonium-, methyltributylammonium- and tetrabutylammonium bisphenol AF. Such salts may be made by a variety of methods. For instance a methanolic solution of bisphenol AF may be mixed with a methanolic solution of a quaternary ammonium salt, the pH is then raised with sodium methoxide, causing an inorganic sodium salt to precipitate. After filtration, the tetraalkylammonium/BPAF salt may be isolated from solution by evaporation of the methanol. Alternatively, a methanolic solution of tetraalkylammonium hydroxide may be employed in place of the solution of quaternary ammonium salt, thus eliminating the precipitation of an inorganic salt and the need for its removal prior to evaporation of the solution.

In addition, derivatized polyhydroxy compounds such as mono- or diesters, and trimethylsilyl ethers are useful crosslinking agents. Examples of such compositions include, but are not limited to resorcinol monobenzoate, the diacetate of bisphenol AF, the diacetate of sulfonyl diphenol, and the diacetate of hydroquinone.

Vulcanization accelerators (also referred to as cure accelerators) which may be used in the curable fluoroelastomer compositions include tertiary sulfonium salts such as $[(C_6H_5)_2S^+(C_6H_{13})][Cl]^-$, and $[(C_6H_{13})_2S(C_6H_5)]^+[CH_3CO_2]^-$ and quaternary ammonium, phosphonium, arsonium, and stibonium salts of the formula $R_5R_6R_7R_8Y^+X^-$, where Y is phosphorous, nitrogen, arsenic, or antimony; $R_5$, $R_6$, $R_7$, and $R_8$ are individually $C_1$-$C_{20}$ alkyl, aryl, aralkyl, alkenyl, and the chlorine, fluorine, bromine, cyano, —OR, and —COOR substituted analogs thereof, with R being $C_1$-$C_{20}$ alkyl, aryl, aralkyl, alkenyl, and where X is halide, hydroxide, sulfate, sulfite, carbonate, pentachlorothiophenolate, tetrafluoroborate, hexafluorosilicate, hexafluorophosphate, dimethyl phosphate, and $C_1$-$C_{20}$ alkyl, aryl, aralkyl, and alkenyl carboxylates and dicarboxylates. Particularly preferred are benzyltriphenylphosphonium chloride, benzyltriphenylphosphonium bromide, tetrabutylammonium hydrogen sulfate, tetrabutylammonium hydroxide, tetrapropylammonium hydroxide, tetrabutylammonium bromide, tributylallylphosphonium chloride, tributyl-2-methoxypropylphosphonium chloride, 1,8-diazabicyclo[5.4.0]undec-7-ene, and benzyldiphenyl(dimethylamino)phosphonium chloride. Other useful accelerators include methyltrioctylammonium chloride, methyltributylammonium chloride, tetrapropylammonium chloride, benzyltrioctylphosphonium bromide, benzyltrioctylphosphonium chloride, methyltrioctylphosphonium acetate, tetraoctylphosphonium bromide, methyltriphenylarsonium tetrafluoroborate, tetraphenylstibonium bromide, 4-chlorobenzyltriphenyl phosphonium chloride, 8-benzyl-1,8-diazabicyclo(5.4.0)-7-undecenonium chloride, diphenylmethyltriphenylphosphonium chloride, allyltriphenyl-phosphonium chloride, tetrabutylphosphonium bromide, m-trifluoromethyl-benzyltrioctylphosphonium chloride, and other quaternary compounds disclosed in U.S. Pat. Nos. 5,591,804; 4,912,171; 4,882,390; 4,259,463; 4,250,278 and 3,876,654. The amount of accelerator used is between 0.05 and 2 parts by weight per hundred parts by weight fluoroelastomer (0.05-2 phr). Preferably, 0.1 to 1.0 parts accelerator per hundred parts fluoroelastomer is used.

The curable compositions of the invention also contain between 0.1 and 4 (preferably 0.3 to 2) parts by weight of at least one unsaturated metal compound process aid per 100 parts fluoroelastomer.

The process aid has the formula $Y_{(4-n)}MX_n$ wherein Y is selected from alkyl, aryl, carboxylic acid, or alkyl ester groups; M is selected from Si, Ge, or Sn; X is an allyl group $CR^1R^2CR^3=CR^4R^5$, vinyl group $CR^1=CR^2R^3$, allenyl group $CR^1=C=CR^2R^3$, alkynyl group $C=CR^1$, or propargyl group $CR^1R^2C=CR^3$; $R^1$-$R^5$ are selected independently from the group consisting of H, F, alkyl, aryl, heterocycle, or perfluoroalkyl groups; and n is 1, 2, or 3. The $R^1$-$R^5$ group may be a mixed alkyl and perfluoroalkyl group such as $CF_3(CF_2)_5CH_2CH_2$—. Preferred for Y groups are phenyl groups or alkyl groups. Most preferred Y groups are alkyl groups, particularly where each alkyl group has 4, 6 or 8 carbon atoms. Carboxylic acid Y groups can be for example octanoic or stearic acid or a diacid such as maleic acid. Allyl and vinyl groups are preferred for X and allyl is most preferred. It is preferred that n is 1 or 2 and most preferred that n is 1. It is preferred that the $R^1$-$R^5$ groups be H or F and most preferably H. Introduction of an excess of non-hydrogen R groups on the unsaturated X group can be detrimental to performance due to steric hindrance. However introduction of 1, 2 or 3 non-hydrogen groups can in some instances improve performance. The syntheses of unsaturated tin compounds is described for example in Organotin Chemistry, 2nd Ed. (Wiley-VCH, 2004, Weinheim, Germany, Alwyn G. Davies author). Specific examples of unsaturated metal compound coagents suitable for use in this invention include, but are not limited to allyltributyltin, methallyltri-n-butyltin, diallyldibutyltin, allyltriphenyltin, tributyl(vinyl)tin, diallyldioctyltin, allyltriphenylstannane, allyltriphenylgermane, vinyltriphenyltin, allyltriphenylsilane, allyltrioctylstannane, allyltrioctylgermane, vinyltrioctylstannane, divinyldioctylstannane, and triphenyl(vinyl)silane.

Without being bound by theory, the reduction in viscosity is believed to be caused by association of polar polymer end groups such as carboxylic or sulfonic acids or their salts with the unsaturated metal compound process aid forming a species that has weaker ionic interchain associations and thus lower viscosity.

Other ingredients (e.g. fillers, colorants, process aids, acid acceptors, etc.) commonly employed in elastomer compositions may also be included in the curable compositions of the invention.

The fluoroelastomer, polyhydroxy curative, cure accelerator, unsaturated metal compound process aid and any other ingredients are generally incorporated into a curable composition by means of an internal mixer or rubber mill. The resulting composition may then be shaped (e.g. molded or extruded) and cured to form a fluororubber article. Curing typically takes place at about 150°-200° C. for 1 to 60 minutes. Conventional rubber curing presses, molds, extruders, and the like provided with suitable heating and curing means can be used. Also, for optimum physical properties and dimensional stability, it is preferred to carry out a post curing operation wherein the molded or extruded fluororubber article is heated in an oven or the like for an additional period of about 1-48 hours, typically from about 180°-275° C., generally in an air atmosphere.

EXAMPLES

Test Methods

Mooney viscosity was determined according to ASTM D-1646, large rotor, condition ML 1+10 minutes, measured at 121° C.

Cure characteristics were measured using a Monsanto Moving Die Rheometer (MDR 2000) instrument under the following conditions:
Moving die frequency: 1.66 Hz
Oscillation amplitude: 0.5
Temperature: 177° C. unless otherwise indicated
Duration of test: 24 minutes
The following cure parameters were recorded:
$M_H$: maximum torque level, in units of dN·m
$M_L$: minimum torque level, in units of dN·m
$t_s2$: minutes to 2 units rise above $M_L$
t50: minutes to 50% of maximum torque
t90: minutes to 90% of maximum torque
Tensile properties were determined by ASTM D412.
Compression set resistance was measured according to ASTM D395.

The invention is further illustrated by, but is not limited to, the following examples.

Fluoroelastomer (FKM1) employed in the examples was Viton® VTR-7241, a copolymer of vinylidene fluoride, hexafluoropropylene, and tetrafluoroethylene, available from DuPont.

Example 1 and Comparative Examples A-C

Curable compositions for Example 1 and Comparative Examples A-C were made by compounding the ingredients on a two-roll mill.

Formulations are shown in Table I. Mooney viscosity of the compositions is also shown in Table I. A substantial (27.4%) reduction in Mooney viscosity was observed with allyltributyltin process aid of this Invention (Example 1), while only a minor decrease (1.6-3.9%) in Mooney viscosity was noted for dioctyltin oxide and dibutyltin dilaurate in Comparative Examples B and C.

TABLE I

| Ingredient, phr[1] | Ex. 1 | Comp. Ex. A | Comp. Ex. B | Comp. Ex. C |
|---|---|---|---|---|
| FKM1 | 100 | 100 | 100 | 100 |
| Ca(OH)$_2$ | 6 | 6 | 6 | 6 |
| MgO[2] | 3 | 3 | 3 | 3 |
| Allyltributyltin | 1 | 0 | 0 | 0 |
| Dioctyltin oxide | 0 | 0 | 1 | 0 |
| Dibutyltindilaurate | 0 | 0 | 0 | 1 |
| Carbon black N990 | 30 | 30 | 30 | 30 |
| VC50[3] | 2.5 | 2.5 | 2.5 | 2.5 |
| Microcel E[4] | 1 | 0 | 0 | 0 |
| Mooney viscosity, ML(1 + 10) @121° C. | 91.1 | 125.4 | 123.4 | 120.5 |
| Curing Characteristics (177° C./24 min.) | | | | |
| ML, dNm | 1.41 | 1.89 | 1.76 | 1.93 |
| MH, dNm | 20 | 17.52 | 16.62 | 21.33 |
| ts2, minutes | 1.82 | 4.54 | 2.73 | 3.31 |
| t50, minutes | 2.17 | 5.65 | 3.45 | 4.38 |
| t90, minutes | 2.84 | 8.19 | 4.63 | 5.61 |
| Compression set, 25% Deflection | | | | |
| Compression Set 200° C., 70 h, % | 65 | 51 | 66 | 59 |
| Physical Properties | | | | |
| Hardness, Shore A | 83 | 76 | 80 | 83 |
| M50, MPa | 3.26 | 2.61 | 2.95 | 3.27 |
| M100, MPa | 5.19 | 4.36 | 4.44 | 5.14 |
| M200, MPa | 10.32 | 8.62 | 8.7 | 9.78 |
| Tb, MPa | 12.29 | 12.34 | 12.16 | 12.6 |
| Eb (%) | 261 | 337 | 312 | 294 |
| Tensile (20°) Hot Air Aged 168 h/250° C. | | | | |
| Hardness, % retention | 99% | 101% | 98% | 99% |
| M50, % retention | 82% | 89% | 76% | 84% |
| M100, % retention | 59% | 79% | 63% | 63% |
| Tb, % retention | 45% | 66% | 42% | 47% |
| Eb, % retention | 153% | 107% | 131% | 148% |

[1]parts by weight per hundred parts rubber (i.e. fluoroelastomer)
[2]Elastomag 170, (available from Akrochem Corp.)
[3]a mixture of bisphenol AF and a quaternary phosphonium salt (available from DuPont)
[4]Calcium metasilicate (available from Celite Corporation)

Example 2-3 and Comparative Example D

Curable compositions for Examples 2-3 and Comparative Example D were made by compounding the ingredients on a two-roll mill. Formulations are shown in Table 2. Mooney viscosity of the compositions is also shown in Table 2. Mooney viscosity was reduced 9.7-12.1% by the silanes of this Invention.

TABLE 2

| Ingredient, phr[1] | Comp. Ex. D | Example 2 | Example 3 |
|---|---|---|---|
| FKM1 | 100 | 100 | 100 |
| Ca(OH)$_2$ | 6 | 6 | 6 |
| MgO[2] | 3 | 3 | 3 |
| Allyltriphenylsilane | 0 | 1 | 0 |
| Triphenyl(vinyl)silane | 0 | 0 | 1 |
| Carbon black N990 | 30 | 30 | 30 |
| VC50[3] | 2.5 | 2.5 | 2.5 |
| Mooney viscosity, ML(1 + 10) @121° C. | 117.1 | 102.9 | 105.7 |
| *Curing Characteristics (190° C./30 min.)* | | | |
| ML, dNm | 1.24 | 1.17 | 1.26 |
| MH, dNm | 17.02 | 16.85 | 17.53 |
| ts2, minutes | 2.71 | 2.33 | 2.14 |
| t50, minutes | 3.4 | 2.87 | 2.63 |
| t90, minutes | 4.56 | 3.73 | 3.41 |
| *Compression set, 25% Deflection* | | | |
| Compression Set 200° C., 70 h, % | 36 | 33 | 37 |
| *Physical Properties* | | | |
| Hardness, Shore A | 71 | 72 | 74 |
| M50, MPa | 2.12 | 2.13 | 2.4 |
| M100, MPa | 3.76 | 3.92 | 4.26 |
| M200, MPa | 9.14 | 9.45 | 9.81 |
| Tb, MPa | 12.96 | 10.91 | 13.04 |
| Eb (%) | 269 | 221 | 260 |
| *Tensile (20°) Hot Air Aged 70 h/275° C.* | | | |
| Hardness, % retention | 101% | 100% | 100% |
| M50, % retention | 86% | 86% | 83% |
| M100, % retention | 70% | 65% | 62% |
| M200, % retention | 54% | 51% | 46% |
| Tb, % retention | 71% | 80% | 59% |
| Eb, % retention | 137% | 167% | 160% |

[1]parts by weight per hundred parts rubber (i.e. fluoroelastomer)
[2]Elastomag 170, (available from Akrochem Corp.)
[3]a mixture of bisphenol AF and a quaternary phosphonium salt (available from DuPont)

What is claimed is:

1. A curable fluoroelastomer composition comprising:
   A) a polyhydroxy curable fluoroelastomer consisting essentially of
      i) vinylidene fluoride, hexafluoropropylene, and optionally tetrafluoroethylene,
      ii) vinylidene fluoride, perfluoro(alkyl vinyl ether), 2-hydropentafluoropropylene, and optionally tetrafluoroethylene;
      iii) tetrafluoroethylene, propylene, and optionally 3,3,3-trifluoropropene;
      iv) tetrafluoroethylene, perfluoro(methyl vinyl ether) and hexafluoro-2-(pentafluorophenoxy)-1-(trifluorovinyloxy) propane, or
      v) ethylene, tetrafluoroethylene, perfluoro(methyl vinyl ether), and optionally 3,3,3-trifluoropropylene;
   B) a polyhydroxy curative;
   C) a cure accelerator; and
   D) an unsaturated metal compound process aid having the formula $Y_{(4-n)}MX_n$ wherein Y is selected from alkyl, aryl, carboxylic acid, or alkyl ester groups; M is selected from Si, Ge, or Sn; X is an allyl group $CR^1R^2CR^3=CR^4R^5$, vinyl group $CR^1=CR^2R^3$, allenyl group $CR^1=C=CR^2R^3$, alkynyl group $C\equiv CR^1$, or propargyl group $CR^1R^2C\equiv CR^3$; $R^1$-$R^5$ are selected independently from the group consisting of H, F, alkyl, aryl, heterocycle, or perfluoroalkyl groups; and n is 1, 2, or 3.

2. The curable composition of claim 1 wherein said unsaturated metal compound process aid is of the formula $Y_{(4-n)}MX_n$ wherein M is Sn, X is allyl group $CR^1R^2CR^3=CR^4R^5$, Y is alkyl or aryl, $R^1$-$R^5$ are H and n is 1 or 2.

3. The curable composition of claim 2 wherein said unsaturated metal compound process aid is allyltrioctylstannane.

4. The curable composition of claim 2 wherein said unsaturated metal compound process aid is allyltriphenylstannane.

5. The curable composition of claim 2 wherein said unsaturated metal compound process aid is diallyldioctylstannane.

6. The curable composition of claim 1 wherein said unsaturated metal compound process aid is of the formula $Y_{(4-n)}MX_n$ wherein M is Sn, X is vinyl group $CR^1=CR^2R^3$, Y is alkyl or aryl, $R^1$-$R^3$ are H and n is 1.

7. The curable composition of claim 6 wherein said unsaturated metal compound process aid is vinyltrioctylstannane.

8. The curable composition of claim 6 wherein said unsaturated metal compound process aid is vinyltriphenylstannane.

9. The curable composition of claim 1 wherein said unsaturated metal compound process aid is of the formula $Y_{(4-n)}MX_n$ wherein M is Ge, X is allyl group $CR^1R^2CR^3=CR^4R^5$, Y is alkyl or aryl, $R^1$-$R^5$ are H and n is 1.

10. The curable composition of claim 9 wherein said unsaturated metal compound process aid is allyltrioctylgermane.

11. The curable composition of claim 9 wherein said unsaturated metal compound process aid is allyltriphenylgermane.

12. The curable composition of claim 1 wherein said unsaturated metal compound process aid is of the formula $Y_{(4-n)}MX_n$ wherein M is Si, X is allyl group $CR^1R^2CR^3=CR^4R^5$, Y is alkyl or aryl, $R^1$-$R^5$ are H and n is 1.

13. The curable composition of claim 12 wherein said unsaturated metal compound process aid is allyltriphenylsilane.

14. The curable composition of claim 1 wherein said unsaturated metal compound process aid is of the formula $Y_{(4-n)}MX_n$ wherein M is Si, X is vinyl group $CR^1=CR^2R^3$, Y is alkyl or aryl, $R^1$-$R^3$ are H and n is 1.

15. The curable composition of claim 14 wherein said unsaturated metal compound process aid is triphenyl(vinyl)silane.

* * * * *